(12) United States Patent
Ganz et al.

(10) Patent No.: US 11,226,005 B2
(45) Date of Patent: Jan. 18, 2022

(54) BEARING ARRANGEMENTS, AND MODULE CARRIER FOR THEM

(71) Applicant: Schaeffler Technologies AG & Co. KG, Herzogenaurach (DE)

(72) Inventors: Katrin Ganz, Elfershausen (DE); Sergej Mensch, Schwebheim (DE); Horst Brehm, Bischberg (DE); Dianchen Zhu, Burkardroth (DE); Daniel Ludwig, Gochsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/771,544

(22) PCT Filed: Nov. 12, 2018

(86) PCT No.: PCT/DE2018/100916
§ 371 (c)(1),
(2) Date: Jun. 10, 2020

(87) PCT Pub. No.: WO2019/120365
PCT Pub. Date: Jun. 27, 2019

(65) Prior Publication Data
US 2021/0172480 A1 Jun. 10, 2021

(30) Foreign Application Priority Data
Dec. 18, 2017 (DE) .................... 10 2017 130 335.9

(51) Int. Cl.
*F16C 41/00* (2006.01)
*G01P 3/44* (2006.01)
(Continued)

(52) U.S. Cl.
CPC ............ *F16C 41/007* (2013.01); *G01P 3/443* (2013.01); *F16C 33/6659* (2013.01); *F16C 2220/02* (2013.01); *G01M 13/04* (2013.01)

(58) Field of Classification Search
CPC ...... F16C 19/52; F16C 33/581; F16C 33/583; F16C 33/586; F16C 33/6659;
(Continued)

(56) References Cited

U.S. PATENT DOCUMENTS

| | | | |
|---|---|---|---|
| 2008/0152272 A1* | 6/2008 | Debrailly | G01P 3/487 384/448 |
| 2013/0301966 A1* | 11/2013 | Abgrall | G01P 1/00 384/448 |

(Continued)

FOREIGN PATENT DOCUMENTS

| | | |
|---|---|---|
| CN | 102301149 A | 12/2011 |
| CN | 102369445 A | 3/2012 |

(Continued)

*Primary Examiner* — Phillip A Johnson

(57) ABSTRACT

A bearing arrangement includes two bearing rings which can be rotated with respect to one another about a common axis, an annular module carrier, an encoder, and at least one sensor module. The module carrier is arranged axially on one of the two bearing rings. The encoder is arranged on the other one of the two bearing rings. The at least one sensor module is arranged in the module carrier. In some embodiments, the module carrier has a cut-out on at least one of its axial side surfaces, through which a lubricant can be introduced into the bearing. The cut-out is arranged circumferentially in the region away from the sensor modules. In other embodiments, the module carrier has at least one predetermined break point for configuring a cut-out.

5 Claims, 1 Drawing Sheet

(51) Int. Cl.
*F16C 33/66* (2006.01)
*G01M 13/04* (2019.01)

(58) Field of Classification Search
CPC ............... F16C 33/6681; F16C 41/007; F16C 2220/02; G01M 13/04; G01P 3/442; G01P 3/446; G01D 11/245; G01D 11/30
See application file for complete search history.

(56) References Cited

U.S. PATENT DOCUMENTS

| | | | | |
|---|---|---|---|---|
| 2014/0185973 | A1* | 7/2014 | Barcat | F16C 41/007 384/448 |
| 2015/0192430 | A1* | 7/2015 | Blokland | H01R 12/585 324/207.25 |
| 2018/0045748 | A1* | 2/2018 | Winkler | G01P 3/443 |
| 2020/0325938 | A1* | 10/2020 | Yamamoto | F16J 15/3272 |

FOREIGN PATENT DOCUMENTS

| | | | | |
|---|---|---|---|---|
| CN | 102859218 | A | 1/2013 | |
| CN | 105570290 | A | 5/2016 | |
| CN | 106065903 | A | 11/2016 | |
| CN | 107250586 | A | 10/2017 | |
| DE | 112011102924 | T5 | 7/2013 | |
| DE | 102015202127 | A1 | 8/2016 | |
| DE | 102015202129 | A1 | 8/2016 | |
| DE | 102015202130 | A1 | 8/2016 | |
| DE | 102015203861 | A1 | 9/2016 | |
| JP | 2010127638 | A | 6/2010 | |
| JP | 2012032329 | A | 2/2012 | |
| JP | 6601034 | B2 | 11/2019 | |
| WO | 2010116207 | A1 | 10/2010 | |
| WO | WO-2010133924 | A1 * | 11/2010 | ............ G01D 15/00 |
| WO | 2013005067 | A1 | 1/2013 | |
| WO | 2013175257 | A1 | 11/2013 | |
| WO | 2016148009 | A1 | 9/2016 | |
| WO | WO-2017022682 | A1 * | 2/2017 | ............ F16C 19/383 |

* cited by examiner

BEARING ARRANGEMENTS, AND MODULE CARRIER FOR THEM

CROSS-REFERENCE TO RELATED APPLICATIONS

This application is the U.S. National Phase of PCT Appln. No. PCT/DE2018/100916 filed Nov. 12, 2018, which claims priority to DE 10 2017 130 335.9 filed Dec. 18, 2017, the entire disclosures of which are incorporated by reference herein.

TECHNICAL FIELD

The present disclosure relates to a bearing arrangement, which has a module carrier which contains at least one sensor. The disclosure furthermore relates to a module carrier, equipped with sensors, for a bearing.

BACKGROUND

A kit for bearings and a bearing arrangement are described in DE 10 2015 202 130 A1. The kit comprises a plurality of modules, which each comprise a plurality of supply management modules, functional modules and infrastructure modules. The functional modules, in particular sensors, serve for measuring bearing state variables.

An electronic module arrangement for installation in a cylindrical installation space and a rolling bearing arrangement are described in DE 10 2015 202 129 A1 and in DE 10 2015 202 127 A1. DE 10 2015 202 129 A1 describes that an electronic module arrangement comprises a hollow cylindrical carrier adapted to the diameter of the cylindrical installation space, an electrical conductor arranged in the carrier in the circumferential direction and electronic modules arranged in the carrier. The individual electronic modules are electrically, and preferably also mechanically, connected to one another by means of electrical conductors. Electronic modules are, for example, sensors, actuators, signal processing devices and data storage devices.

Greases are known to be used for lubricated-for-life groove ball bearings, which do not need re-lubricating. Other bearing types, for example tapered roller bearings, cylindrical roller bearings or self-aligning roller bearings, need re-lubricating, in particular with oil. If these bearings are instrumented, i.e. equipped with at least one sensor detecting a bearing state variable, re-lubrication is only possible with difficulty.

To measure the rotational speed in a bearing, for example, sensors are fastened to a bearing ring. The bearing furthermore comprises an encoder arranged opposite the sensors. The encoder is frequently formed as an encoder ring which is arranged on the other bearing ring. To achieve good measuring quality, the sensors and the encoder are at a small spacing from one another. The smaller the spacing or the air gap, the higher the measuring quality. With small bearing diameters and a small air gap or spacing between the sensors and the encoder, the bearing, in particular a bearing lateral face, is sealed virtually completely, whereby lubrication or re-lubrication of the instrumented bearing is prevented or at least hindered.

WO 2013/175257 A1 discloses a sensor bearing unit, which can be used in an oil-lubricated environment. The sensor bearing unit comprises a bearing having at least one rotatable bearing ring. The sensor unit furthermore comprises a detection device, which serves to detect the rotation of the rotatable bearing ring. At least one axially aligned side of the bearing has a portion which is designed to be open in the axial direction, parallel to the central axis about which the bearing ring rotates. The open portion enables a flow of oil through the bearing. In particular, a flow of oil through the detection device is realized along a strict axial direction between the target or encoder and the sensor.

SUMMARY

It is desirable to provide a bearing arrangement for easier lubrication and/or re-lubrication of an instrumented bearing with a module carrier so as to enable a volume flow of a lubricant through a lubricated bearing. It is also desirable to improve the volume flow of a lubricant through an oil-lubricated bearing.

A bearing arrangement has two bearing rings which can be rotated with respect to one another about a common axis, the axis of rotation. The bearing arrangement furthermore comprises a ring-shaped module carrier, an encoder and at least one sensor module. The module carrier serves to receive modules, in particular functional modules such as sensor modules or supply modules, for example, with which, for instance, the function of a mechanical bearing can be checked. The module carrier is fastened axially to one of the two bearing rings, in particular axially to the lateral face of one of the two bearing rings, in a torsion-resistant manner. The encoder is arranged on the other of the two bearing rings in a torsion-resistant manner. The encoder, also referred to as the target, is located at a radial spacing with respect to the module carrier. The at least one sensor module is arranged in the module carrier so that the sensor module is arranged opposite the encoder and these interact with one another. The module carrier has an opening in one of its axial lateral faces. A lubricant can be introduced into the bearing by means of the opening so that a flow of lubricant to and through the bearing rings can be enabled, along with the lubrication thereof. The opening of the module carrier is arranged circumferentially in a region spaced from the at least one sensor module or in the region between two sensor modules. The position of the opening between two sensor modules or at a point at which a sensor module is not positioned on the module carrier enables a flow of lubricant.

Lubricants can be oils or greases which are known to be used for lubricating bearings.

The sensor module and the encoder serve for measuring bearing state variables and/or for triggering and/or activating specified events under specified conditions.

The module carrier is preferably designed to be a hollow cylinder with a circumferential wall and axial lateral faces or end faces and can also be referred to as a module housing. The module carrier has a plurality of receiving means for receiving modules, such as sensor modules. The receiving means are preferably arranged on the inner circumference of the module carrier. A respective module position for the individual modules is defined between two receiving means on the module carrier. The receiving means serve to seat the modules securely on the module carrier.

The opening in the axial lateral face of the module carrier is preferably located outside the defined module position of the at least one sensor module. The opening in the axial lateral face of the module carrier is alternatively preferably located outside the regions in which the receiving means for the modules and the at least one sensor module is arranged. The opening in the axial lateral face of the module carrier is particularly preferably formed at a module position at which a sensor module is not arranged. In a first embodiment, the outer edge or the outer radial lateral face of the module carrier does not have an opening, thereby increasing the stability of the ring-shaped module carrier.

In another embodiment, the module carrier has a respective opening in its two axial lateral faces. The two openings are preferably arranged opposite one another on the module carrier. The two openings are alternatively preferably arranged circumferentially offset from one another on the axial lateral faces of the module carrier.

In an embodiment which is again modified, the module carrier has more than two openings, which are arranged in its axial lateral faces. Two or more openings, wherein at least one respective opening is located in each of the two axial lateral faces of the module carrier, enable a flow of lubricant to and/or from the bearing rings, i.e. a flow of lubricant through the bearing.

One advantage is that new lubricant can be frequently or continuously supplied to the bearing and old lubricant transported away from the bearing. The lubrication of the bearing can be ensured and a dry running state prevented. Re-lubricating the bearing increases its useful life. The bearing arrangement can be permeated by a lubricating medium.

The sensor module can be a rotational speed sensor module, for example, which is provided for installation in a mechanical bearing and serves for measuring and evaluating a rotational speed. In particular, the sensor module can be installed in the available installation space of a bearing kit. The bearing kit corresponds, for example, to the bearing kit described in DE 10 2015 202 130 A1. The sensor module can likewise be mounted on a carrier of an electronic module arrangement according to DE 10 2015 202 129 A1. The mechanical bearing is preferably a rolling bearing, a linear bearing or a slide bearing.

A plurality of sensor modules are preferably arranged on the module carrier. At least one sensor module and at least one further module of a different module type are preferably arranged on the module carrier. Further modules may be, for example, functional modules, supply management modules, and/or infrastructure modules.

The number and type of modules arranged on the module carrier are preferably selected based on their function. Furthermore, the number and type of modules arranged on the module carrier are dependent on the diameter of the bearing or on the module carrier diameter adapted to the bearing diameter.

A plurality of sensor modules and possibly further modules are electrically connected to one another on the module carrier by means of an electrical conductor. An interface is provided by means of the electrical conductor.

The at least one sensor module on the module carrier may be cast in a potting compound so that protection against external influences and from the lubricant is realized. All modules located on the module carrier may be cast in the potting compound. The potting compound may form a ring in which the modules are incorporated. A gap, through which a lubricant can be introduced into the bearing, is located between the ring of potting compound and the encoder. The gap between the encoder and the ring of potting compound with the incorporated sensor modules should be kept small to increase the measuring quality.

In one embodiment, the module carrier with the at least one sensor module is fastened to an outer ring edge and the encoder to an inner ring edge. In an alternative embodiment, the module carrier with the at least one sensor module is fastened to an inner ring edge and the encoder to an outer ring edge.

The module carrier may be made from plastic or steel.

The module carrier, the at least one sensor module, and the electrical conductor together form a sensor unit.

Another embodiment of the bearing arrangement comprises two bearing rings, which can be rotated with respect to one another about a common axis, a ring-shaped module carrier, an encoder and at least one sensor module. The module carrier is arranged axially on one of the two bearing rings. The encoder is arranged on a lateral face of the other of the two bearing rings, opposite the module carrier. The at least one sensor module is located in the module carrier. The module carrier has at least one predetermined breaking point on at least one of its axial lateral faces, which, after being broken open, forms an opening in the module carrier through which a lubricant can be introduced into the bearing. The predetermined breaking point or the predetermined breaking points are provided or located in a region in which a sensor module is not located.

The axial lateral face of the module carrier is located opposite the axial lateral face of the module carrier which abuts against one of the bearing rings, in particular the lateral face thereof.

For the opening or openings produced by breaking open the predetermined breaking point, the description relating to the bearing arrangement described above applies to all embodiments. The further advantage of this embodiment consists especially in that the configuration of the bearing arrangement can be completed once it is installed in a superordinate unit. If a flow of lubricant through the module carrier is required, the opening is produced at the predetermined breaking point. If, instead, a flow of lubricant is not required and the priority is to instead protect against the penetration of dirt, for example, then the module carrier remains closed.

The module carrier preferably has two predetermined breaking points. The module carrier may alternatively have four or more predetermined breaking points.

One advantage of a plurality of predetermined breaking points for forming a respective opening at a defined position is that the position and number of predetermined breaking points can be selected individually according to each application.

The module carrier for a bearing comprises a plurality of receiving means, between which module positions for each receiving a module are formed. The module carrier furthermore comprises at least one opening or a predetermined breaking point for forming an opening after being broken open at one of its axial lateral faces. The module carrier enables a flow of lubricant in its installed state.

The module carrier preferably has an electrical conductor by means of which the modules can be electrically connected to one another and to the environment.

Modules, in particular sensor modules, arranged on the module carrier are preferably surrounded by potting compound. The potting compound is preferably formed in a ring shape.

BRIEF DESCRIPTION OF THE DRAWINGS

Further details, advantages and further developments are revealed in the description below of preferred embodiments, with reference to the drawing, which shows.

DETAILED DESCRIPTION

Figure 1:
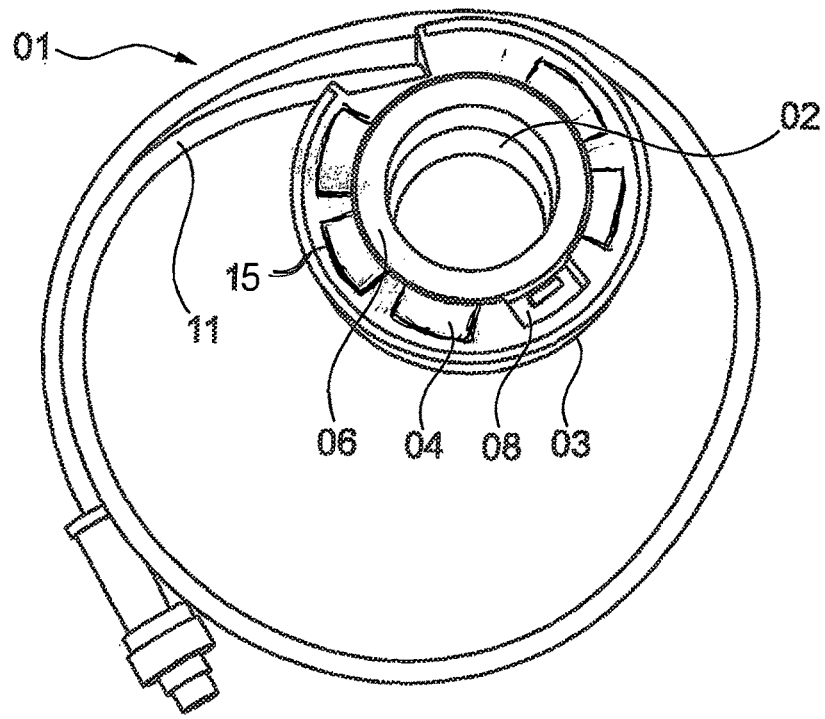
FIG. 1 a perspective view of a bearing arrangement.
Figure 2:
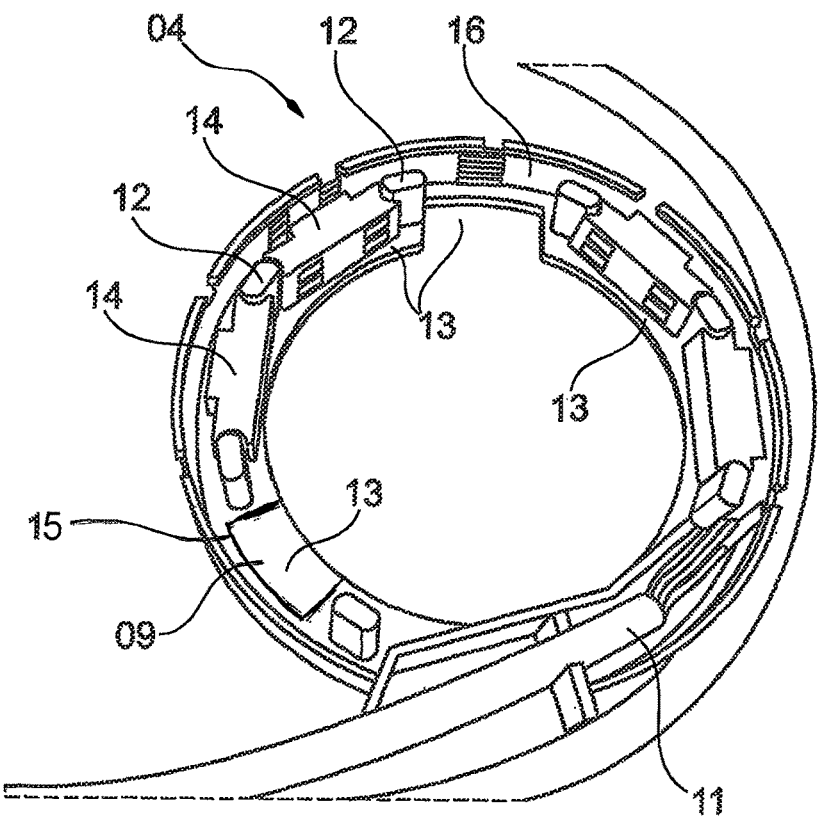
FIG. 2 a perspective view of a module carrier for the bearing arrangement.

FIG. 1 shows a perspective view of a bearing arrangement 01. The bearing arrangement 01 comprises an inner bearing ring 02, an outer bearing ring 03, a module carrier 04 and an encoder ring 06. The inner bearing ring 02 and the outer bearing ring 03 are arranged with respect to one another about an axis of rotation (not shown). The inner bearing ring 02 can be rotated about the axis of rotation. The encoder ring 06 is arranged in a torsion-resistant manner on a lateral face (not shown) of the inner bearing ring 02. The module carrier 04 is arranged in a torsion-resistant manner on the outer bearing ring 03, opposite the encoder ring 06. The module carrier has an opening 08. The opening 08 is arranged in an axial lateral face 09 (c.f. FIG. 2), wherein this axial lateral face 09 of the module carrier 04 is opposite the lateral face of the outer bearing ring 03 against which the module carrier 04 abuts. The module carrier 04 is shown in FIG. 2, in which its construction is detailed more clearly. The bearing arrangement 01 furthermore comprises an electrical connection 11 for connection to a measuring device or a control unit (not shown). The opening 08 in the module carrier 04 serves for the flow of lubricant through the bearing arrangement 01, whereby the bearing rings 02, 03 do not run dry, become worn and possibly cause the bearing to fail.

FIG. 2 shows a perspective view of a module carrier 04 for the bearing arrangement 01. The module carrier 04 has receiving means 12 between which module positions 13 are formed. The module carrier 04, as illustrated, has six module positions 13. The receiving means 12 serve for receiving and securely holding modules 14, in particular sensor modules 14. In FIG. 2, four sensor modules 14 are arranged on the module carrier 04. The sensor modules 14 are electrically connected to one another by means of an electrical conductor 16. The electrical conductor 16 is connected to the electrical connection 11. The opening 08 in the module carrier 04 is formed at one of the module positions 13. The opening 08 serves for the flow of lubricant. Predetermined breaking points 15 can be formed at the module positions 13 for forming openings 08 as a result of breaking open the predetermined breaking points. To protect the sensor module 14, these can be overmolded with potting compound.

LIST OF REFERENCE SIGNS

01 Bearing arrangement
02 Inner bearing ring
03 Outer bearing ring
04 Module carrier
05 -
06 Encoder ring
07 -
08 Opening
09 Axial lateral face of the module carrier 04
10 -
11 Electrical connection
12 Receiving means
13 Module position
14 Sensor-/Module
15 -
16 Electrical conductor

The invention claimed is:

1. A bearing arrangement comprising:
   two bearing rings which can be rotated with respect to one another about a common axis;
   a ring-shaped module carrier having an axial lateral face, the module carrier arranged on a lateral face of a first of the two bearing rings;
   an encoder, which is arranged on a second of the two bearing rings, opposite the module carrier; and
   at least one sensor module, which is arranged in the module carrier, wherein the module carrier has at least one predetermined breaking point on its axial lateral face, which, after being broken open, forms an opening in the module carrier through which a lubricant can be introduced into the bearing, wherein the predetermined breaking point is arranged in a region in which a sensor module is not located.

2. The bearing arrangement as claimed in claim 1, wherein the module carrier has two to six predetermined breaking points on an axial lateral face.

3. The bearing arrangement as claimed in claim 1 wherein the predetermined breaking point is arranged between two adjacent sensor modules of the at least one sensor module.

4. The bearing arrangement as claimed in claim 1, wherein the at least one sensor module on the module carrier is cast in a potting compound.

5. The bearing arrangement as claimed in claim 4, wherein the potting compound forms a ring in which the at least one sensor module is located, wherein a gap is formed between the ring of potting compound and the encoder.

* * * * *